United States Patent [19]

Gulczynski

[11] Patent Number: 5,057,990
[45] Date of Patent: Oct. 15, 1991

[54] BIDIRECTIONAL SWITCHING POWER APPARATUS WITH AC OR DC OUTPUT

[76] Inventor: Zdzislaw Gulczynski, P.O. Box 11633, Costa Mesa, Calif. 92627

[21] Appl. No.: 518,080

[22] Filed: May 2, 1990

[51] Int. Cl.$^5$ .......................................... H02M 7/537
[52] U.S. Cl. .................................... 363/131; 363/132; 323/350
[58] Field of Search ................ 363/24.37, 63, 89, 132, 363/131; 323/266, 271, 282, 349, 350, 351

[56] References Cited

U.S. PATENT DOCUMENTS

| | | | |
|---|---|---|---|
| 4,476,441 | 10/1984 | Gulczynski | 330/262 X |
| 4,736,286 | 4/1988 | Gulczynski | 323/282 X |
| 4,740,878 | 4/1988 | Carter et al. | 363/63 |
| 4,763,080 | 8/1988 | Gulczynski | 330/10 |
| 4,803,610 | 2/1989 | Gulczynski | 363/70 |
| 4,845,391 | 7/1989 | Gulczynski | 307/254 X |
| 4,853,837 | 8/1989 | Gulczynski | 363/89 X |
| 4,871,980 | 10/1989 | Gulczynski | 330/255 X |
| 4,940,906 | 7/1990 | Gulczynski | 307/296.1 |
| 4,947,308 | 8/1990 | Gulczynski | 363/37 X |
| 4,949,234 | 8/1990 | Gulczynski | 363/89 X |
| 4,956,760 | 9/1990 | Gulczynski | 363/37 X |

Primary Examiner—Steven L. Stephan
Assistant Examiner—Emanuel Todd Voeltz

[57] ABSTRACT

The bidirectional switching power apparatus converts DC input voltage into single AC or multiple DC output voltages. Power transformer is used if line isolation is necessary. Number of switching components and peak currents thereof are minimal. The DC input voltage is lower than the AC or DC output voltages. The switching power apparatus has a first and second capacitors coupled to ground for storing a first and second voltages respectively. One switch selectively applies the DC input voltage across an inductor which attains a current. Another switch selectively applies the current to ground. A diode applies the current to the first capacitor. An amplifier converts the first and second voltages into the AC output signal. Two other diodes apply the second voltage and AC output signal to a node. The DC input voltage is referenced to the node rather than ground.

20 Claims, 2 Drawing Sheets

BIDIRECTIONAL SWITCHING POWER APPARATUS WITH AC OR DC OUTPUT

CROSS REFERENCE TO RELATED INVENTIONS

This invention is related to: "Switching Power Apparatus with 3-State Driver" Ser. No. 517,853 filed on even date herewith; "Capacitive Load Driver with Binary Output" Ser. No. 474,488 filed 02/02/90; "3-Terminal Bidirectional Switching Power Supply with AC or DC Input and AC or DC Output" Ser. No. 444,729 filed 12/01/89; "Switching Power Supply with Constant or Sinusoidal Input Current and with Fixed or Variable Output Voltage" Ser. No. 444,730 filed 12/01/89; "Switching Power Supply with Constant or Sinusoidal Input Current" Ser. No. 393,391 filed 08/14/89; "Switching Power Supply Comprising Pair of Converters for Obtaining Constant or Sinusoidal Input Current and Fixed or Variable Output Voltage" Ser. No. 393,392 filed 08/14/89; "Ultra Efficient Switching Power Amplifier" U.S. Pat. No. 4,980,649 dated 12/25/90; "Synchronous Switching Power Supply Comprising Buck Converter" Ser. No. 363,325 filed 06/08/89; "Synchronous Switching Power Supply Comprising Boost or Flyback Converter" Ser. No. 363,326 filed 06/08/89; "Synchronous Switching Power Supply with Boost and/or Flyback Converters" Ser. No. 363,327 filed 06/08/89; "High Power Switching Power Supply" U.S. Pat. No. 4,947,308 dated 08/07/90; "High Efficiency Power Factor Correction Circuit" U.S. Pat. No. 4,949,234 dated 08/14/90; "High Power Switching Power Supply with High Power Factor" Ser. No. 304,508 filed 01/31/89; "High Power Switching Power Supply Having High Power Factor" U.S. Pat. No. 4,956,760 dated 09/11/90; "Power Switch Driver" U.S. Pat. No. 4,940,906 dated 07/10/90; "Synchronous Switching Power Supply with Flyback Converter" U.S. Pat. No. 4,853,837 dated 08/01/89; "High Efficiency Power Amplifier Comprising Multilevel Power Supply" U.S. Pat. No. 4,871,980 dated 10/03/89; "Switching Power Amplifier" U.S. Pat. No. 4,763,080 dated 08/09/88; "Switching Circuits Performing Thyristor and Triac Functions" U.S. Pat. No. 4,845,391 dated 07/04/89; "Switching Power Supply" U.S. Pat. No. 4,803,610 dated 02/07/89; "Switching Power Supply" U.S. Pat. No. 4,736,286 dated 04/05/88; and "Push-Pull Power Amplifier" U.S. Pat. No. 4,476,441 dated 10/09/84.

All inventions are by the same inventor.

BACKGROUND OF THE INVENTION

The invention relates to bidirectional switching power supply (SPS), particularly for power supply systems requiring a conversion of an AC or DC input voltage into single AC or multiple DC output voltages. A power transformer is used if line isolation is necessary. For instance, the SPS can be employed in uninterruptible power supply (UPS) system for converting a low battery voltage into 120 V/60 Hz or 220 V/50 Hz, and for charging the battery.

Conventional SPSs with single AC or multiple DC outputs provide either crudely stabilized DC voltages or employ regulator for each DC output. An isolation transformer is employed whether or not line isolation is required. One or two large capacitors are employed to store voltages prior to the transformation. After rectification, two other large capacitors store bipolar voltages which are converted into the AC output signal having the desired waveform. Pulse width modulation (PWM) is used which results in numerous problems including high circuit complexity, stability problems and significantly higher effective switching frequency. Numerous interference suppressors and protection circuits are inevitable.

Power transformers may be the worst components used in electronics, their employment demands specific considerations. For instance, the transformers demonstrate huge EMI and RFI, poor efficiency, leakage inductances, parasitic resistances, resonant elements, frequency limitations, flux symmetry problems, nonlinearities and saturation, bidirectional feedback, inability to provide DC signal, large size and weight, high cost. The imbalance in operating flux level is reduced by a series coupled capacitor which must sustain AC voltage and high currents. High frequency switching is essential in order to minimize size of the transformer.

UPS systems provide AC power during commercial power fluctuations and interruptions. An UPS comprises a charger, battery and inverter. The charger rectifies the line voltage and charges the battery. The inverter converts the battery voltage and provides the AC power. A continuous UPS system is coupled in series with line. The charger must be able to deliver enough power to drive the inverter at full load, maintain the charge on the battery and handle momentary overloads. A forward transfer UPS system is coupled in parallel with line and delivers AC power only during the power failure. A bidirectional transfer switch connects the critical load either to line or inverter output. The battery voltage is usually very low.

Half bridge and full bridge converters are commonly used in high power SPSs. Full bridge converter is preferred if very high output power is required. However, full bridge converter demands two times more power semiconductor devices than half bridge converter. This magnifies often most essential problems associated with mechanical arrangement, controlling, driving and protection of the power devices. In contrast, half bridge converter demands semiconductor devices with double voltage ratings and a pair of supply voltages having opposite polarities in reference to one output terminal. Specific measures must be taken in the converter itself in order to obtain adequate levels of supply currents. However, prices of the devices having double voltage ratings are often only slightly higher. Moreover, the SPS according to the present invention provides a pair of voltages which can have even values and opposite polarities.

SUMMARY OF THE INVENTION

The present invention is intended to provide an SPS for converting an AC or DC input voltage into single AC or multiple DC output voltages. A power transformer is eliminated if line isolation is unnecessary in order to minimize EMI, RFI, power loss, size, weight, cost, etc. The number of switching components and peak currents thereof are minimal so that high output power, high efficiency and high reliability are achieved. Moreover, a bidirectional operation can be accomplished with no additional switches. The SPS can be employed in an UPS system, switching power amplifier, programmable converter, line conditioner, AC voltage converter, frequency converter, power factor correction circuit, etc.

There are three basic configurations for converting a predetermined DC input voltage into desired DC output voltage. Assuming positive input voltage, three components of these converters are connected to the input, ground and output respectively:

buck converter—switch, anode of diode and inductor;

boost converter—inductor, switch and cathode of diode; and flyback converter—switch, inductor and anode of diode.

The output voltages of the buck and boost converters are respectively lower and higher than the input voltage, and have the same polarity. In contrast, the flyback converter develops output voltage which, relative to the input voltage, is lower or higher and has opposite polarity. It is assumed that a capacitor is coupled to the output of a converter, output current is J, and input and output voltages are E and V respectively. Minimal currents conducted by the components of the buck, boost and flyback converters are slightly higher than J, $J\sqrt{V/E}$ and $J\sqrt{1+V/E}$ respectively.

The DC input voltage can be boosted by means of the boost or flyback converter. The boost converter requires smaller current ratings of the components but develops inrush current. The DC input voltage source may be a rechargeable battery, wherein bidirectional power flow is desirable. The power transfer from the output to input is accomplished by attaining a reverse inductor current of the boost or flyback converter. The components of the buck converter have smallest current ratings. Moreover, the inductor rather than semiconductor device is coupled to the output. Therefore, an output stage based on the buck converter is preferred for providing AC output voltage.

SPS according to the present invention comprises: a first and second capacitive means for storing a first and second voltages respectively; an inductive means for attaining a current; a first switching means for selectively applying a DC input voltage across the inductive means; a second switching means for selectively applying the current to ground; a diode means for applying the current to the first capacitive means; and an amplifier means for converting the first and second voltages into an output signal, wherein the DC input voltage is referenced to the second voltage.

In another embodiment the SPS further includes: a node; a second diode means for applying the second voltage to the node; and a third diode means for applying the output signal to the node, wherein the DC input voltage is referenced to the node.

BRIEF DESCRIPTION OF THE DRAWINGS

The present invention will become more clear in conjunction with the accompanying figures throughout which similar references may denote similar parts and of which.

DETAILED DESCRIPTION OF THE INVENTION

Figure 1:
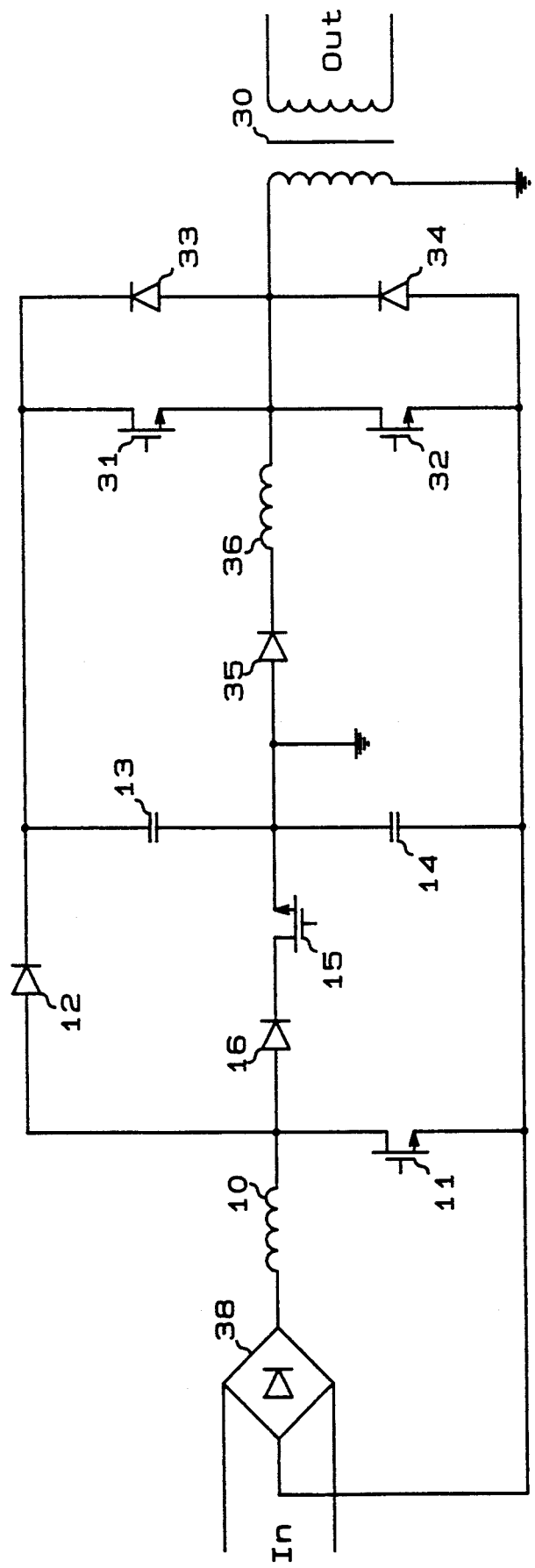
FIG. 1 is the embodiment of unidirectional SPS with AC input and AC output. Transformer is employed if line isolation is necessary.

FIG. 1 is the embodiment of unidirectional SPS with AC input and AC output. The SPS comprises the capacitors 13 and 14 which are coupled to ground for storing a positive and negative voltages respectively. The diode bridge 38 rectifies the AC input voltage, e.g. line voltage, and provides pulsating DC input voltage. Obviously, the SPS also employs an input line filter, not shown for simplicity. The DC input voltage is applied across a pair of terminals which are separately coupled to the inductor 10 and capacitor 14. Therefore, the DC input voltage is referenced to the negative voltage rather than ground. The DC input voltage varies in a wide range, wherein SPS input current is uninterrupted. For instance, if line voltage is 120 V, voltages stored in the capacitors 13 and 14 may be 180 V and −180 V respectively. The N-channel MOSFET 11 selectively applies the DC input voltage across the inductor 10 which attains a current. The inductor 10 is charged when the transistor 11 is closed.

The N-channel MOSFET 15 selectively applies the current of the inductor 10 to ground. The diode 16 is coupled in series with the transistor 15 for preventing reverse currents therein. The capacitors 13 and 14 are coupled in series and are charged by the same current of the inductor 10 when the transistors 11 and 15 are open, wherein the diode 12 applies the inductor current to the capacitor 13. A high gate-source voltage is applied to the transistor 15 when the transistor 11 is closed, wherein the diode 16 is reverse biased. Subsequently, when the transistor 11 opens, the transistor 15 and diode 16 take over the inductor current automatically, whereby only the capacitor 14 is charged. The transistor 15 is switched at zero voltage and zero current. A thyristor can be substituted for the transistor 15 and diode 16.

An output amplifier converts the positive and negative voltages into the AC output signal, wherein a pair of switches selectively applies the voltages to a node. Specifically, one switch is coupled to the capacitor 13, and includes the N-channel MOSFET 31 and diode 33 coupled in parallel therewith. The other switch is coupled to the capacitor 14, and includes the N-channel MOSFET 32 and diode 34 coupled in parallel therewith. The primary of the transformer 30 is coupled between the node and ground. The AC output signal of the SPS appears across the secondary of the transformer 30.

The output amplifier further includes the inductor 36 coupled between the node and ground for attaining a DC offset current. The diode 35 is coupled in series with inductor 36 for conducting the DC offset current. The capacitors 13 and 14 are discharged thru the output amplifier. In this as in most other applications pure AC output signal, i.e. whose average value is zero, is produced since average primary current of the transformer 30 is equal to zero. The capacitors 13 and 14 must be equally charged and discharged as to maintain equal voltages thereacross. However, performance of real components would result in an indefinite drift of the capacitor voltages due to uneven leakage currents of the capacitors 13 and 14, distinctive switching characteristics of the transistors 31 and 32, etc. The DC offset current causes an imbalance so that the capacitor 14 is discharged more than capacitor 13.

Specifically, when the transistor 31 is closed, the positive voltage is applied across the primary of the transformer 30. When the transistor 32 is closed, the negative voltage is applied across the primary as well as across the inductor 36. When the transistor 32 opens, the DC offset current of the inductor 36 continues to flow thru the diodes 33 and 35 to the capacitor 13. By these means, the currents discharging the capacitors 13 and 14 are respectively lower and higher than the current flowing to the primary of the transformer 30. The DC offset current is compensated for by switching the transistor 15 so that the capacitor voltages remain substantially equal. The transistor 15 and diodes 16, 35 have relatively small current ratings since the DC offset current is significantly smaller than maximum primary current of the transformer 30.

Output amplifier having another configuration can be employed, e.g. as disclosed in the aforementioned "Switching Power Apparatus with 3-State Driver" Ser. No. 517,853 filed on even date herewith, "3-Terminal Bidirectional Switching Power Supply with AC or DC Input and AC or DC Output" Ser. No. 444,729 filed 12/01/89, "Ultra Efficient Switching Power Amplifier" U.S. Pat. No. 4,980,649 dated 12/25/90, "Switching Power Amplifier" U.S. Pat. No. 4,763,080 dated 08/09/88 and "Switching Power Supply" U.S. Pat. No. 4,803,610 dated 02/07/89, all by the same inventor.

The SPS can be used for providing merely the positive and negative output voltages. Specifically, the capacitor 14 is charged thru the transistor 15 and diode 16 or both capacitors 13 and 14 are charged thru the diode 12. It is necessary that load coupled across the capacitor 13 draws a smaller current than load coupled across the capacitor 14. For instance, a small AC voltage can be applied to the SPS input. The voltages across the capacitor 13 and 14 may be 5 V and −2 V respectively for supplying a digital system. The capacitor 14 may deliver a significantly higher output current than capacitor 13. The values of the capacitors 13 and 14 may be even or, preferably, proportional to the respective output currents.

Furthermore, the components 32, 33 and 36 can be used, wherein other components of the output amplifier are superfluous. When the transistor 32 is closed, the negative voltage is applied across the inductor 36. When the transistor 32 opens, the diode 33 applies the inductor current to the capacitor 13. The output current provided by the capacitor 14 is preferably higher or slightly lower than the output current provided by capacitor 13. The difference between the output currents determines current ratings of the transistors 15, 32 and diodes 16, 33.

Generally, the SPS can be used to convert the DC input voltage into multiple DC output voltages. The SPS has a plurality of terminals with the DC output voltages appearing thereat. The capacitors 13 and 14 represent a plurality of capacitors coupled in series between a pair of the terminals for storing voltages and with any other terminal separately coupled to a pair of the capacitors. The transistor 11 selectively applies the DC input voltage across the inductor 10 which attains the current. Each of at least one additional switching means selectively applies the inductor current to one of the terminals except for any terminal of the pair of the terminals. The transistor 15 and series coupled diode 16 represent one additional switching means.

Any terminal can be coupled to ground. The diode 12 applies the inductor current to one terminal of the pair of the terminals. The DC input voltage is referenced to the other terminal of the pair of the terminals. Accordingly, the two terminals are separately coupled to the capacitors 13 and 14. The third terminal is coupled to ground and so the additional switching means selectively applies the inductor current to ground.

Figure 2:
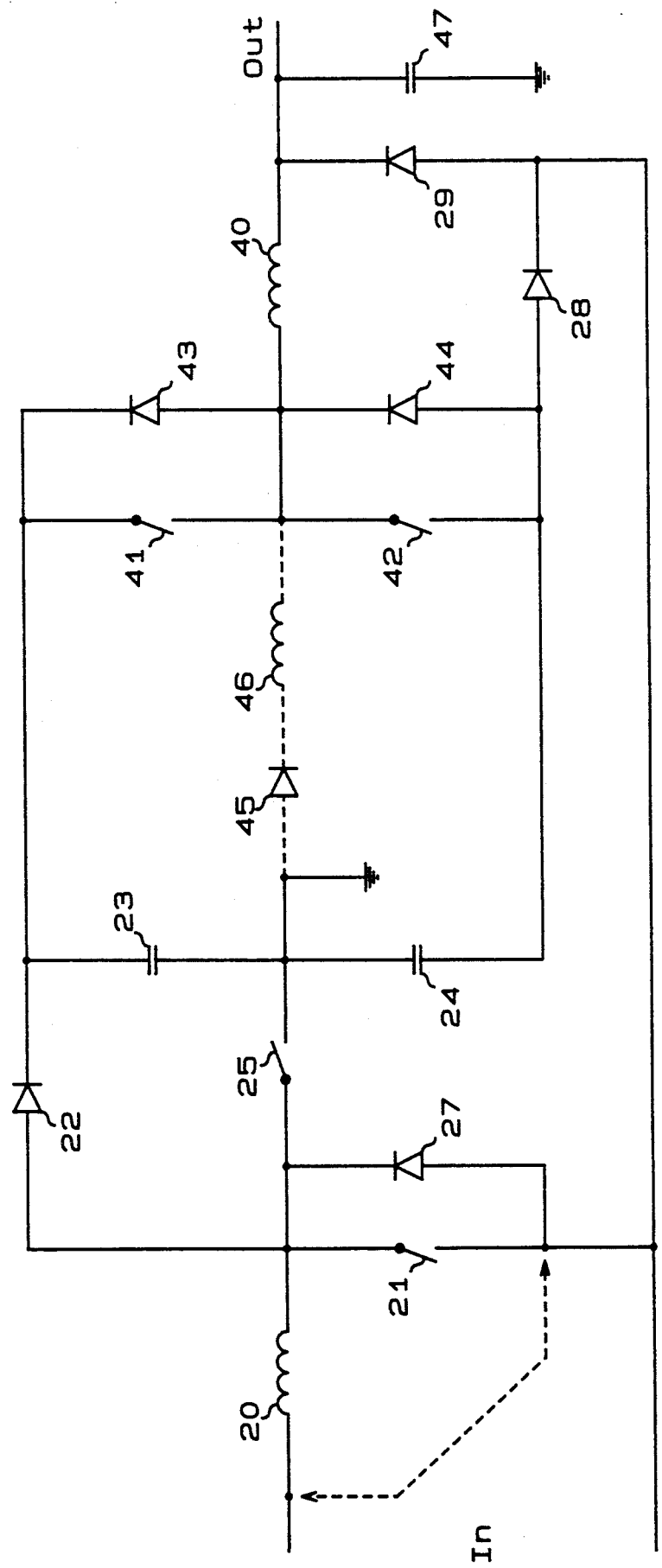
FIG. 2 is the embodiment of bidirectional SPS with DC input and AC output. Switch 25 is unidirectional or bidirectional.

FIG. 2 is the embodiment of bidirectional SPS with DC input and AC output. The components 20 thru 24 and 40 thru 46 correspond to components 10 thru 14 and 30 thru 36 of FIG. 1 respectively. In particular, the switches 21, 41 and 42 correspond to N-channel MOSFETs 11, 31 and 32 of FIG. 1 respectively. The diodes 27 thru 29 are introduced to accomplish the bidirectional operation, wherein the switch 25 is unidirectional or bidirectional. The diodes 28 and 29 are coupled to a node and further to one terminal of the SPS input. The DC input voltage is applied across the SPS input and is thus referenced to the node rather than ground. The components 40 thru 47 constitute the output amplifier.

The output amplifier converts the positive and negative voltages, stored in the capacitors 23 and 24 respectively, into the AC output voltage. Moreover, the positive and negative voltages are higher and lower than positive and negative peaks of the AC output voltage respectively. The inductor 40 provides the AC output voltage and has one terminal selectively coupled to the positive and negative voltages, and the other terminal coupled to the SPS output. The output capacitor 47 is coupled to the SPS output for storing a momentary value of the AC output voltage, reducing voltage ripple and preventing voltage spikes. The capacitor 47 may be also a portion of the load.

The AC output voltage is increased by closing the switch 41, whereby the inductor 40 is charged. When the switch 41 opens, the inductor current continues to flow to the SPS output, wherein the capacitor 24 is charged thru the diode 44. Similarly, the output voltage is decreased by closing the switch 42, whereby the inductor 40 is charged. When the switch 42 opens, the inductor current continues to flow to the SPS output, wherein the capacitor 23 is charged thru the diode 43. Uninterrupted output current can be produced.

The diodes 27 thru 29 are employed to accomplish reverse power transfer. For instance, the signal applied to the SPS output is AC. The diode 28 has anode and cathode coupled to the capacitor 24 and node respectively. The diode 29 has cathode and anode coupled to the SPS output and node respectively. Therefore, the diodes 28 and 29 apply the negative voltage and AC output voltage to the node respectively. Power is transferred from the SPS input to output as in the FIG. 1 embodiment, wherein the diode 28 also takes part. Specifically, when the switch 21 is closed, the inductor 20 is charged. When the switch 21 opens, the current of the inductor 20 flows either thru the diode 22 and capacitors 23, 24 or thru switch 25 and capacitor 24, and further thru the diode 28 to the node.

During the reverse power transfer, the current of the inductor 20 flows in the reverse direction. Specifically, when the switch 25 is closed, the diode 28 is reverse biased. If the AC output voltage is smaller than the voltage at the node, the diode 29 conducts, whereby the inductor 20 as well as the DC input voltage source are charged. The diode 27 is coupled in parallel with the switch 21 and, when the switch 25 opens, takes over the inductor current. The voltage at the node is then undefined but limited by the diodes 28 and 29.

In one embodiment, the switch 25 is unidirectional and operates only during the reverse power transfer. The switch 25 may include N-channel MOSFET and series coupled diode such as 15 and 16 of FIG. 1 respectively, whereas the source of the transistor 15 and anode of the diode 16 are exchanged. When power is transferred from the SPS input to output, the switch 25 is open. The capacitors 13 and 14 are charged by the same current of the inductor 10 and, accordingly, must be discharged by equal currents. This is accomplished by adequate switching of the switches 41 and 42. The SPS output signal must be pure AC, as defined hereinabove.

In another embodiment, the switch 25 is bidirectional. The switch 25 may include additional N-channel MOSFET and diode coupled as 15 and 16 in FIG. 1 respectively. A bidirectional switch disclosed in the aforementioned "Switching Circuits Performing Thyristor and Triac Functions" U.S. Pat. No. 4,845,391 dated 07/04/89, by the same inventor, can be also employed. The bidirectional switch 25 allows to charge the capacitor 24 more than capacitor 23, as in the FIG. 1 embodiment. Consequently, the SPS can provide a negative DC output voltage or AC output voltage with a negative offset.

The inductor 46 and series coupled diode 45 can be also used to introduce a DC offset current. By these means, the output amplifier can provide a DC output voltage having either polarity or AC output voltage with or without DC offset. The diode 45 and inductor 46 are coupled and operate as the diode 35 and inductor 36 of FIG. 1 respectively. In particular, when the switch 42 is closed, the negative voltage stored in the capacitor 24 is applied across the inductor 46. When the switch 42 opens, the current of the inductor 36 continues to flow thru the diodes 43 and 45 to the capacitor 23. When the AC voltage is applied to the SPS output, the diode 45 and inductor 46 must sustain the AC voltage. However, the inductor 46 is used merely to cause the imbalance of the capacitor voltages and may have a large inductance.

The flyback configuration is established by exchanging the transistor 11 of FIG. 1 or switch 21 with parallel coupled diode 27 of FIG. 2 for the respective inductor 10 or 20. This is illustrated by the dashed line in FIG. 2. In any case, the switch 11 or 21 selectively applies the DC input voltage across the inductor 10 or 20 respectively. The DC input voltage must be negative in reference to the negative voltage in FIG. 1 embodiment and node in FIG. 2 embodiment. The circuit operation remains substantially the same. The flyback converter requires higher ratings of the components as pointed out hereinabove.

The embodiment of the present invention described herein are intended to be taken in an illustrative and not a limiting sense. Various modifications and changes may be made to these embodiments by persons skilled in the art without departing from the scope of the present invention as defined in the appended claims.

I claim:

1. Switching power apparatus, comprising:
   a pair of inputs with a DC input voltage appearing thereacross;
   a first and second capacitive means coupled to ground for storing a first and second voltages respectively;
   an inductive means coupled to one input for attaining a current;
   a first switching means coupled to the other input for selectively applying the DC input voltage across the inductive means;
   a second switching means for selectively applying the current to ground;
   a diode means for applying the current to the first capacitive means; and
   an amplifier means for converting the first and second voltages into an output signals,
   wherein the DC input voltage is referenced to the second voltage.

2. Switching power apparatus of claim 1 wherein the second switching means includes a transistor and diode coupled in series therewith.

3. Switching power apparatus of claim 1 wherein the amplifier means includes:
   a node;
   a second inductive means coupled to the node for providing the output signal; and
   a third and fourth switching means for selectively applying respectively the first and second voltages to the node.

4. Switching power apparatus of claim 3 wherein the second inductive means includes a transformer.

5. Switching power apparatus of claim 3 wherein the third and fourth switching means each include a transistor and diode coupled in parallel therewith.

6. Switching power apparatus of claim 3 further including:
   a third inductive means coupled to the node for attaining a second current; and
   a second diode means coupled in series with the third inductive means for conducting the second current.

7. Switching power apparatus of claim 3 wherein the amplifier means includes an output capacitive means for storing the output signal.

8. Switching power apparatus of claim 1 wherein the amplifier means includes including:
   a second inductive means coupled to ground for attaining a second current;
   a third switching means for selectively applying the second voltage to the second inductive means; and
   a second diode means for applying the second current to the first capacitive means.

9. Switching power apparatus of claim 1 further including:
   a node;
   a second diode means for applying the second voltage to the node; and
   a third diode means for applying the output signal to the node,
   wherein the DC input voltage is referenced to the node.

10. Switching power apparatus of claim 9 wherein the first switching means includes a fourth diode means for conducting the current.

11. Switching power apparatus of claim 9 wherein the second switching means is bidirectional.

12. Switching power apparatus of claim 1 further including a rectifying means for rectifying an AC input signal and providing the DC input voltage.

13. Switching power apparatus converting DC input voltage into first and second DC output voltages having opposite polarities, comprising:
   a pair of inputs with the DC input voltage appearing thereacross;
   a first and second capacitive means coupled to ground for storing the first and second DC outputs voltages respectively;
   an inductive means coupled to one input for attaining a current;
   a first switching means coupled to the other input for selectively applying the DC input voltage across the inductive means;

a second switching means for selectively applying the current to ground; and a diode means for applying the current to the first capacitive means, wherein the DC input voltage is referenced to the second DC output voltage.

14. Switching power apparatus of claim 13 wherein the second switching means includes a transistor and diode coupled in series therewith.

15. Switching power apparatus of claim 13 further including:

a second inductive means for attaining a second current;

a third switching means for selectively applying the second DC output voltage to the second inductive means; and a second diode means for applying the second current to the first capacitive means.

16. Switching power apparatus of claim 13 further including a rectifying means for rectifying an AC input signal and providing the DC input voltage.

17. Switching power apparatus converting DC input voltage into multiple DC output voltages, comprising:

a pair of inputs with the DC input voltage appearing thereacross;

a plurality of terminals with the DC output voltages appearing thereat;

a plurality of capacitive means coupled in series between a pair of the terminals for storing voltages and with any other terminal separately coupled to a pair of the capacitive means;

an inductive means coupled to one input for attaining a current;

a switching means coupled to the other input for selectively applying the DC input voltage across the inductive means;

at least one additional switching means each for selectively applying the current to one of the terminals except for any terminal of the pair of the terminals; and a diode means for applying the current to one terminal of the pair of the terminals, wherein the DC input voltage is referenced to the other terminal of the pair of the terminals, and further wherein any one of the terminals is coupled to ground.

18. Switching power apparatus of claim 17 wherein each additional switching means includes a transistor and diode coupled in series therewith.

19. Switching power apparatus of claim 17 further including:

a second inductive means coupled to one of the terminals except for any terminal of the pair of the terminals for attaining a second current;

a second diode means for applying the second current to the one terminal of the pair of the terminals; and a second switching means for selectively coupling the second inductive means to the other terminal of the pair of the terminals.

20. Switching power apparatus of claim 17 further including a rectifying means for rectifying an AC input signal and providing the DC input voltage.

* * * * *